Figure 2:
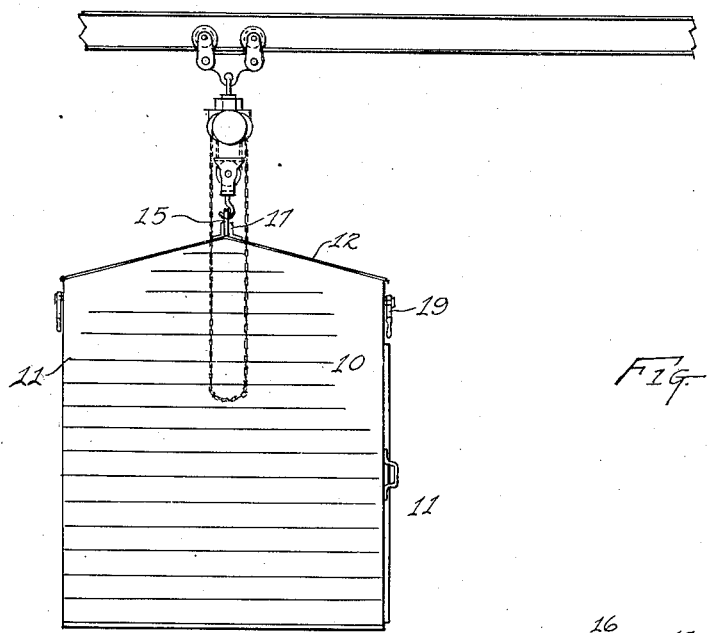

Dec. 11, 1928. 1,694,912

B. F. FITCH

MEANS FOR HANDLING FREIGHT

Filed Dec. 27, 1920 2 Sheets-Sheet 1

INVENTOR
Benjamin F. Fitch
By Baker & Macklin
ATTORNEYS

Dec. 11, 1928.
B. F. FITCH
1,694,912
MEANS FOR HANDLING FREIGHT
Filed Dec. 27, 1920
2 Sheets-Sheet 2
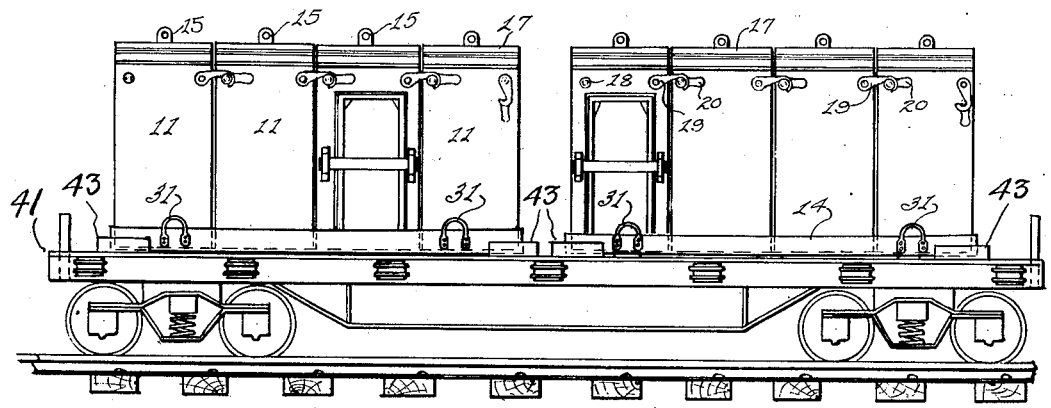
Fig.—4.
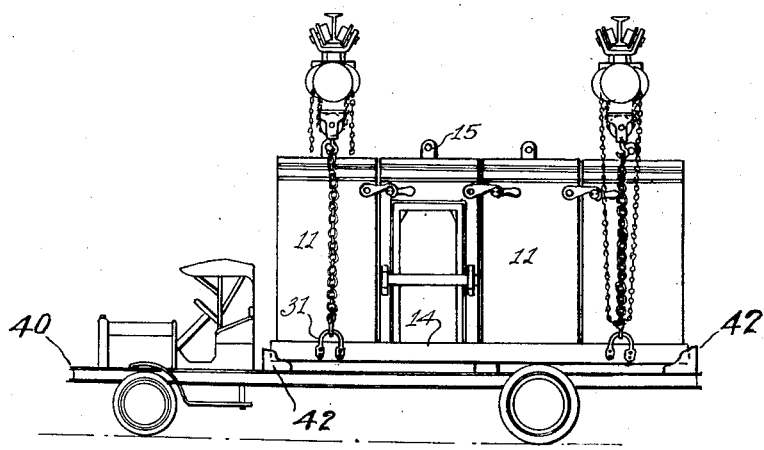
Fig.—3.
INVENTOR
Benjamin F. Fitch,
By Baker & Macklin,
ATTORNEYS Patented Dec. 11, 1928.

1,694,912

UNITED STATES PATENT OFFICE.

BENJAMIN F. FITCH, OF EVANSTON, ILLINOIS, ASSIGNOR TO MOTOR TERMINALS COMPANY, OF WILMINGTON, DELAWARE, A CORPORATION OF DELAWARE.

MEANS FOR HANDLING FREIGHT.

Application filed December 27, 1920. Serial No. 433,252.

This invention relates to a system of handling package or L. C. L. (less than car load) freight shipments, wherein the freight is loaded into containers adapted to be transported by automobile truck, the containers being thereafter transferred to a freight car. As heretofore practiced, if the container comprises a single removable body for a truck, then the truck itself must be delayed at the point of origin during the loading, or heavy duty crane equipment must be provided to raise the loaded body and place it on a truck frame. On the other hand, if a number of units each small enough for convenient handling at the point of origin, is employed on the truck body, there is material delay in transferring them to a car, and a special car having much locking mechanism to effectively hold the containers in place during transportation is needed.

It is an object of the present invention to provide means whereby individual containers may be employed, small enough for convenient handling at the point of origin, for instance at a factory, wholesale store, or warehouse, and to associate these with means for lifting a number of the containers as a unit from the truck body to a freight car.

More specifically I employ a portable frame adapted to be removably mounted on a truck frame, and a series of individual containers adapted to be removably mounted on the frame. This enables each container to be loaded in the appropriate department at the point of origin, and handled by light hoists and placed on the portable frame which is on the truck frame. Then at the transfer point the portable frame with all of the containers on it may be transferred by suitable heavy duty crane equipment directly to the freight car, and held in place thereon by very simple equipment additional to an ordinary flat car.

My invention contemplates the provision of a freight storage container, having means for raising it by a single hoisting block, to enable it to be raised by one operator, and to permit the installation of a light, overhead hoisting mechanism. Furthermore, it contemplates the clamping together of a number of these containers or compartments, and the positioning of such clamped compartments on a portable frame, whereby they may be thereafter raised as a unit, by a heavy duty crane.

The means for accomplishing the above and other objects will be more fully set forth in the following description, which relates to the drawings, and the essential characteristics will be set forth in the claims.

Figure 1:
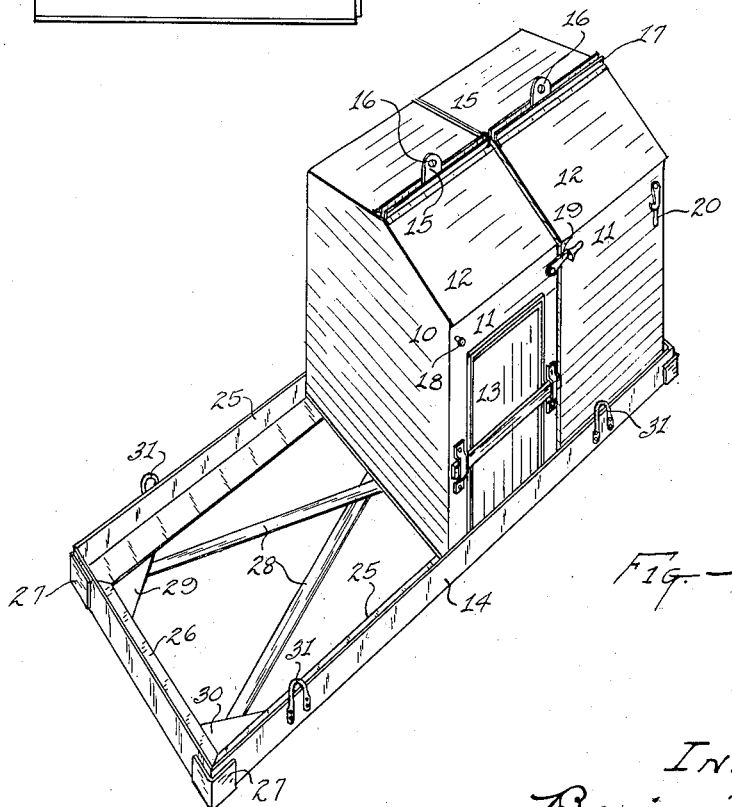

In the drawings Fig. 1 is a perspective showing the individual containers positioned on a supporting frame; Fig. 2 is an end elevation of a container suspended from an overhead hoisting mechanism; Fig. 3 is an elevation of a truck supporting a number of containers, and in position to be raised by an overhead hoisting mechanism; Fig. 4 is an end elevation of a flat railway car, showing the containers in position for transportation.

Designating the parts shown in the drawings by the use of reference characters, 10 and 11 represent the sides and ends respectively of a hollow compartment, provided with a roof 12 and a door 13. These compartments are constructed in any convenient manner and the construction of the door may be such that it can be quickly inserted in position and securely clamped. I have shown the door 13, in Fig. 1, as positioned on the end of the compartment, but provision may be made on one or more sides for a door, so that when one compartment is positioned adjacent another the doors are rendered inaccessible, other than by raising one of the compartments entirely above the others, which can only be effected by the use of a suitable crane. This insures the contents being undisturbed until the car reaches a terminal station. To permit the container to be raised by one operator, I may provide a lug 15, projecting upwardly from the top of the compartment, and provided with an aperture 16, suitable for engagement with a hoisting mechanism. Convenient reinforcing bars 17 extend across the top of the compartment, to hold the lug securely to the compartment during the raising operation.

In the drawings, I have shown a unit as comprising four compartments, and I have shown a mechanism for interlocking the adjacent compartments, which mechanism may comprise a pin and lever connection positioned at the top of each compartment. To permit the interlocking mechanism to be operable, irrespective of the position of one body with relation to another, I provide a pin 18 on two diagonal corners of each compartment, and I provide a lever 19 on the remaining two diagonal corners. With such a relation of pins and levers, the lever of one container will always be adjacent the pin of another container, whenever such containers are placed side by side. Each lever may be provided with a handle 20, to permit an operator to throw the clamping lever into engagement with the pin. By positioning the locking mechanism at the top of each compartment, it is possible to locate the center of gravity at the center of the compartments taken as a unit. Furthermore, any rocking action imparted to the containers while in transit would tend to rotate each container about the bottom edge thereof, and consequently, the clamping of adjacent containers, at the top, provides the most effective interengaging position.

To support the containers as a unit, I provide a frame 14, which is preferably a fabricated structure, having longitudinal angle beams 25 connected at the ends thereof by transverse angle beams 26 and reinforced by plates 27. Diagonal bracing members 28, may be secured to the lower flange of the longitudinal and transverse beams by means of gusset plates 29 and 30. The frame is of such size, that the containers will form a snug fit against the vertical flanges thereof. The height of the flange is such that the top edge thereof extends above the bottom of the door 13, and serves to automatically lock the door against surreptitious opening, as soon as the container is deposited on the frame. To open the door it is therefore necessary to raise the container. This furnishes an effective protection against tampering or theft in transit. To engage the frame by a load engaging mechanism, I prefer to rigidly secure engaging members such as the strips 31 adjacent the corners of the frame and on the longitudinal members thereof. Furthermore, the use of load engaging members, near the base of the containers, enables an operator to engage a hoisting mechanism with considerable ease.

In Fig. 2 I have shown an overhead hoisting mechanism of the mono-rail type, which is convenient for use in warehouses, wherein the structure of the building will not permit the installation of heavy duty cranes. With such an installation the operator may easily raise and transport one of the containers from one part of the building to another part thereof with little difficulty, and place the container on the portable frame, which at that time is in place on the truck. If heavy duty hoisting mechanism is available at the point of origin, time of the trucks may be saved by loading the portable frame while it is positioned on a shipping platform, the operator thereafter raising the loaded frame, and placing it on an automobile truck. At the freight station, heavy duty cranes are available to raise the entire unit, thus permitting rapid handling of freight and preventing loss of time by the waiting truck.

In Figs. 3 and 4, I have illustrated a unit carrying a number of containers as being supported upon a truck 40, and railway car 41 respectively. In the truck, I have illustrated positioning means as embodied in corner brackets 42 which are adapted to be secured at the end of bolsters, and employed for positioning the body while it is being deposited on the truck, and for thereafter holding it in position during transportation. Similarly, I have shown the positioning means on a railway car as embodied in corner blocks 43 which are adapted to be attached to the floor of the car, so as to position the unit and thereafter to prevent it from shifting while the car is in motion.

From the foregoing description, it will be seen that I have provided a method of handling freight, which permits the use of a system wherein removable automobile truck bodies are employed, without the necessity of delaying the truck or requiring the use of heavy-duty, overhead cranes at the point of origin.

Another advantage of my system is that it readily adapts itself for the collection and transportation of freight from different sources where the quantity at any one point of origin for a single destination is not sufficient to fill an entire automobile body. In such case, the truck having the portable frame thereon would drive to different factories, or other points of origin, and at each place one or more containers would be put on the truck. As soon as the portable frame was loaded to capacity, the truck would drive to the freight station.

It will be seen that my system presents great flexibility in the loading of freight at the points of origin, and is adapted for many uses specifically different from the illustrations given.

Having described my invention, I claim:

1. The method of handling freight consisting of loading it into containers, placing a number of such containers side by side on a portable frame, lifting the frame and containers as a unit and depositing it in coaction with positioning means on a transportation device.

2. A method of handling freight consisting of loading it into containers, placing a number of containers adjacent each other, locking each container to an adjacent one, raising all of them as a unit and then depositing the unit between positioning means on a transportation means.

3. A method for handling freight, consisting of placing a number of containers in abutting engagement with each other, clamping the containers together, bringing a member into engagement with the containers, raising the member, whereby all of the containers are raised as a unit, and then depositing the member and containers on a transportation means.

4. The method of handling freight, consisting of placing containers side by side, on a portable frame, locking the containers together, and then raising the frame and containers as a unit by means engaging the frame and depositing it on a freight car having positioning means engaging the frame.

5. A portable container, having a member extending upwardly from the top thereof and adapted to be engaged by a hoisting mechanism, and a locking mechanism, comprising stationary members on two corners of said container, and movable members on the remaining corners thereof, whereby the container may be interlocked with another container positioned adjacent thereto.

6. A container having a member positioned at the top thereof, and adapted to be engaged by a hoisting mechanism, and having locking means comprising a movable member positioned on diagonally opposite corners of the container and a stationary member on the remaining corners, whereby the container may be interlocked with an adjacent container.

7. In combination, an open frame comprising longitudinal and transverse members, with diagonal connecting beams intermediate said members, and an upwardly extending flange on said members, a plurality of containers supported by the frame and in abutting engagement with said flange, means carried by the frame and adapted to be engaged by hoisting mechanism, whereby the frame and containers may be raised as a unit, interlocking means between the containers, and means carried by each container whereby such container may be raised individually from the frame.

8. The combination with a set of portable containers, each provided with means whereby it may be lifted individually, a carrier therefor provided with means for holding said containers side by side and having means whereby it may be lifted with the containers, and a vehicle having means adapted to engage the carrier and position it thereon.

9. The combination with a set of portable containers, each provided with a door in its side, a carrier therefor provided with means for holding said containers side by side and having on each side a pair of members for attachment of lifting devices, and a vehicle having means adapted to engage the carrier and position it thereon.

10. The combination with a vehicle provided with positioning means, of a carrier adapted to engage said means and provided with means for the attachment of a hoisting device, a plurality of doored containers adapted to be mounted on said carrier in a position so that the doors of the containers are unopenable while on the carrier.

11. The combination with a vehicle provided with positioning means, of a carrier adapted to engage said means and provided with means for the attachment of a hoisting device, a plurality of containers each having means for attachment of a lifting device and each having a door in one of its side walls and adapted to be mounted on said carrier in such position so that the doors of the containers are overlapped by means on the carrier.

12. The method of handling freight consisting of loading it into containers, placing a number of such loaded containers side by side on a portable carrier, placing the carrier with the containers as a unit in coaction with positioning means on a transportation device.

13. The method of handling freight consisting of loading it into containers through doorways therein, closing the doors to the containers, placing such containers side by side on a portable carrier in such manner that the doors cannot be opened when the containers are in place, and thereafter moving the carrier with the containers as a unit by means engaging the carrier and placing the same in coaction with positioning means on a transportation device.

14. An apparatus for handling freight consisting of a plurality of doored containers, a portable carrier having obstructing means adapted to extend across the doors of the containers to prevent opening the doors when the containers are placed side by side on the carrier, and mechanism for moving the carrier with the containers as a unit and positioning the same on a vehicle.

15. An apparatus for handling freight comprising the combination of a plurality of individual containers, a portable carrier on which the containers may be mounted, mechanism for lifting the individual containers and depositing them on the carrier, a transportation device, and mechanism for lifting the carrier with its containers as a unit and depositing such unit on the transportation device.

In testimony whereof, I hereunto affix my signature.

BENJAMIN F. FITCH.